United States Patent Office 3,286,151
Patented Nov. 15, 1966

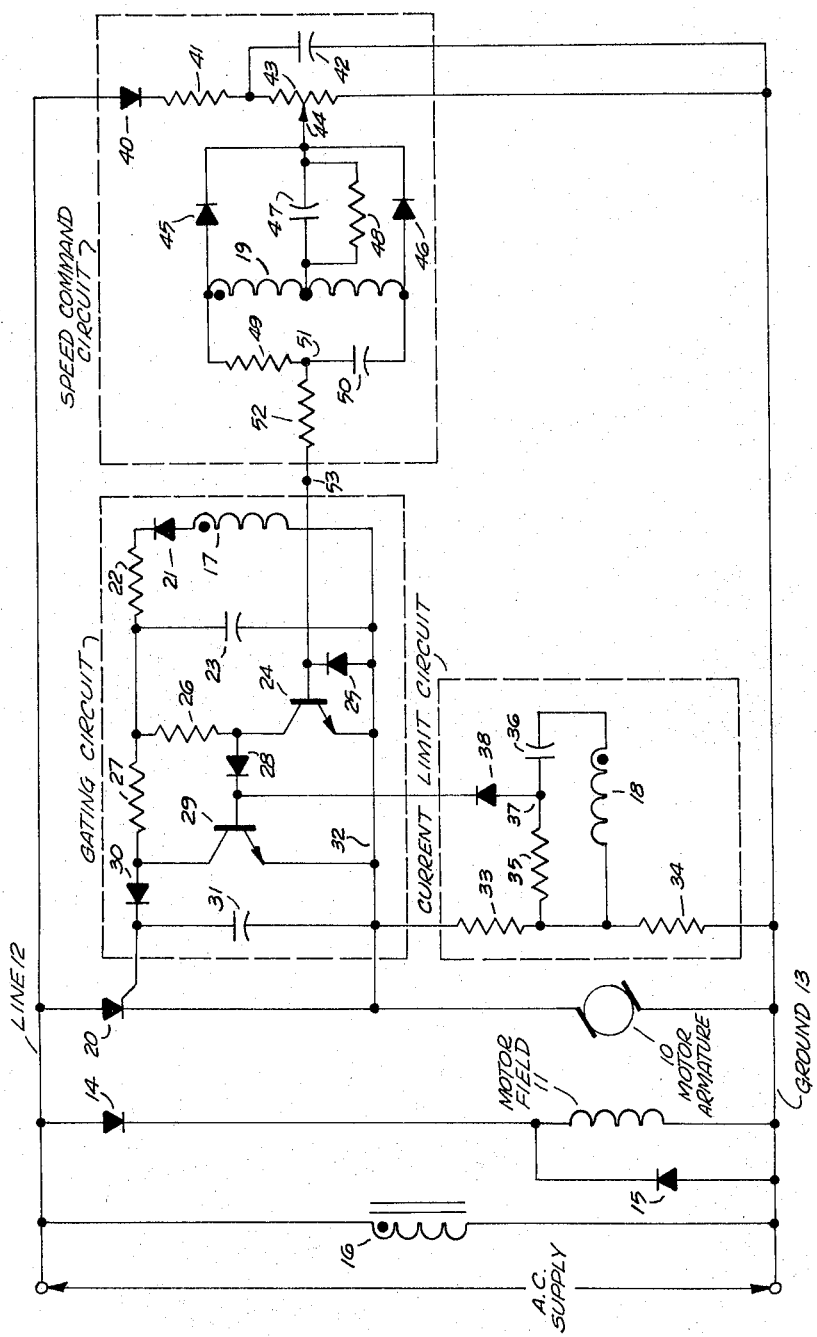

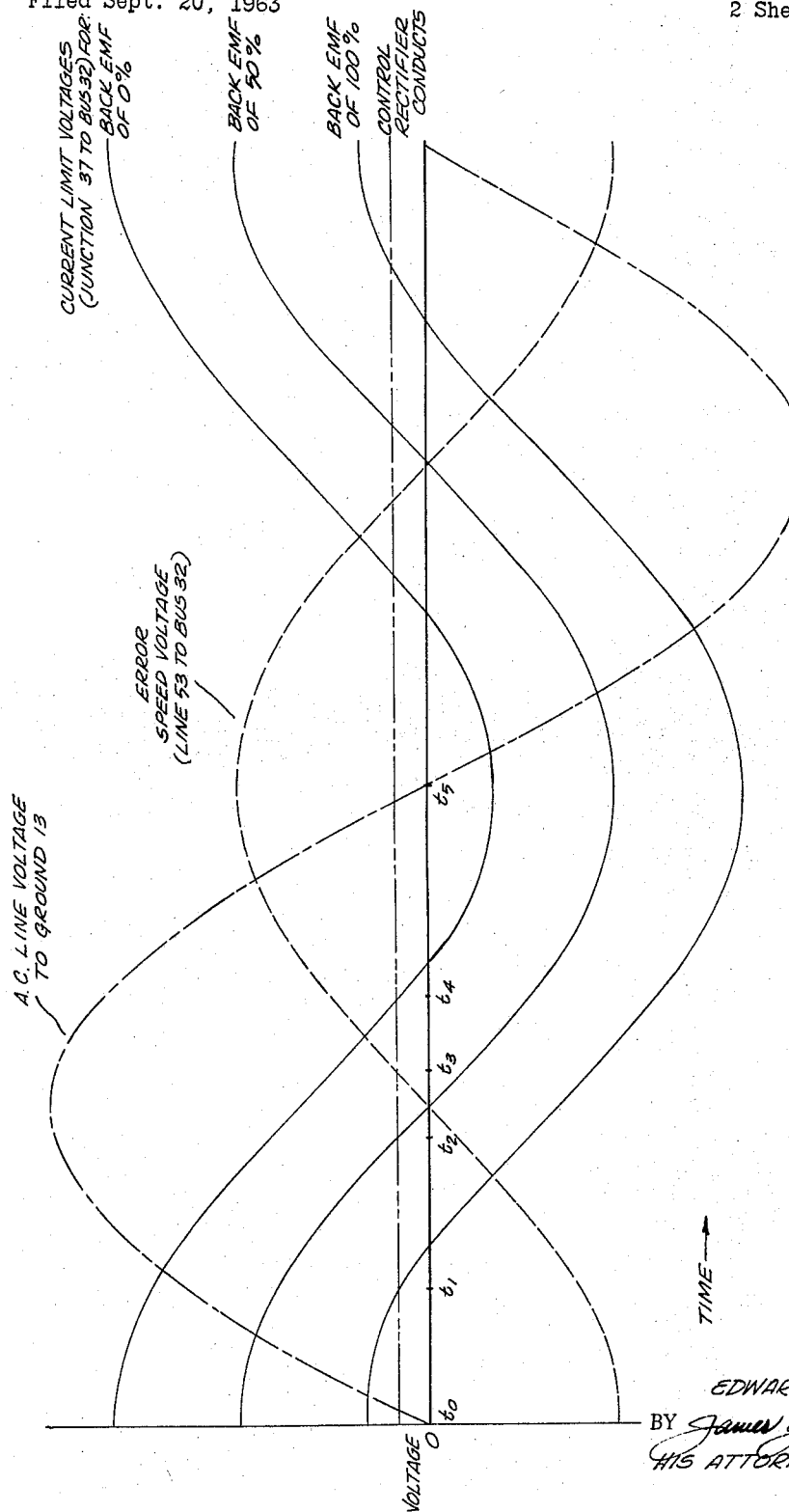

3,286,151
CONTROLLED RECTIFIER CURRENT LIMIT
FOR D.C. MOTOR
Edward H. Dinger, Waynesboro, Va., assignor to General
Electric Company, a corporation of New York
Filed Sept. 20, 1963, Ser. No. 310,242
9 Claims. (Cl. 318—331)

The invention relates to a control circuit, and particularly to a control circuit for limiting the amount of current supplied to the armature of a direct motor.

Known control circuits control the speed of a direct current motor by controlling the point at which a current flow control device begins to conduct during each alternating current cycle. The point of conduction is determined by the relative values of a command voltage and a speed feedback voltage. However, such circuits have a disadvantage. If the command voltage calls for more speed, but if the motor speed and feedback voltage are low (as at starting or under a load), the point of conduction is advanced so that the average armature current is increased. Under some conditions, such as low motor speed, this increased armature current may become excessive.

Accordingly, an object of the invention is to provide an improved motor control circuit.

Another object of the invention is to provide a motor control circuit that limits the armature current of a direct current motor.

Another object of the invention is to provide a motor control circuit that limits the armature current of a direct current motor to a value determined by the back electromotive force produced by the armature.

Another object of the invention is to provide a direct current motor control circuit that maintains the motor speed at a predetermined magnitude if that speed does not require an armature current that exceeds a predetermined value determined by the back electromotive force being produced by the armature.

Briefly, these and other objects of the invention are achieved with a direct current motor armature that is supplied with current when a current control device is conductive. The current control device may conduct when it receives a gating or control signal. This gating signal is supplied to the current control device only if a first signal has a predetermined characteristic that is determined by the back electromotive force of the armature. The supplying of the gating signal to the current control device may be further conditioned on a second signal having a magnitude that is determined by the commanded and actual speed of the motor. The predetermined characteristic of the first signal may be set by the permissible armature current when the armature produces zero back electromotive force. When so set, the first signal adjust istelf for various values of back electromotive force.

The invention is particularly pointed out in the claims. The invention may be better understood from the following description given in connection with the accompanying drawing, in which:

FIGURE 1 shows a schematic diagram of a preferred embodiment of a control circuit in accordance with the invention; and FIGURE 2 shows waveforms for explaining the operation of the control circuit of FIGURE 1.

In FIGURE 1, an alternating current supply of suitable voltage and frequency, for example 115 volts, 60 cycles, is provided. This alternating current supply may be coupled to a line 12 and a ground 13 which may or may not actually be grounded. The direct current motor to be controlled includes a motor armature 10 and a motor field 11. The motor field 11 may be supplied with direct current through a field diode rectifier 14 which has its anode coupled to the line 12 and its cathode coupled to one end of the motor field 11. The other end of the motor field 11 is coupled to the ground 13. A freewheeling diode rectifier 15 may be coupled across the motor field 11. The motor armature 10 is provided with direct current by a control rectifier 20. Such a control rectifier 20 is known in the art, and includes an anode, a cathode, and a control or gate electrode. The anode and cathode of the control rectifier 20 form its main current path. The anode of the control rectifier 20 is coupled to the line 12 and the cathode of the control rectifier 20 is coupled to one side of the motor armature 10. The other side of the motor armature 10 is coupled to the ground 13. The control circuit includes a gating circuit, a current limit circuit, and a speed command circuit. These three circuits are shown enclosed in dashed lines. A supply transformer is provided for supplying various voltages to the control circuit. This supply transformer inclues a primary winding 16 coupled between the line 12 and the ground 13 and three secondary windings 17, 18, 19. The secondary winding 17 is in the gating circuit for supplying a gating or control signal or voltage, the secondary winding 18 is in the current limit circuit for providing a current limit signal or voltage, and the secondary winding 19 is in the speed command circuit for supplying a speed command signal or voltage. The relative polarities of the primary winding 16 and the secondary windings 17, 18, 19 of the supply transformer are indicated by the polarity dots. These dots indicate the ends of the various windings which have the same relative polarity at any given instant.

In the gating circuit, the voltage provided by the secondary winding 17 is rectified by a diode rectifier 21 and filtered by a resistor 22 and a capacitor 23. This rectified and filtered voltage is positive with respect to a reference bus 32 that is connected to the cathode of the control rectifier 20 and to one end of the motor armature 10. This positive voltage is supplied to a resistor 27, which in turn is coupled to a diode rectifier 30. The diode rectifier 30 is coupled to the control or gate electrode of the control rectifier 20. This positive direct current voltage supplies gating or control current for the control rectifier 20. The gating circuit includes first and second transistors 24, 29 of the NPN type. Other types may be used with appropriate circuit modifications. The emitter-collector path of the first transistor 24 is supplied with the rectified and filtered voltage through a resistor 26. The emitter-collector path of the second transistor 29 is supplied with the rectified and filtered voltage by a connection to the resistor 27. The collector of the first transistor is coupled through an isolating diode rectifier 28 to the base of the second transistor 29 so that signals applied to the base of the first transistor 24 are amplified and supplied to the base of the second transistor 29. A capacitor 31 is coupled between the control electrode and cathode of the control rectifier 20 for the purpose of preventing random firing of the control rectifier 20 due to pickup of stray voltages in the lead to its control electrode. A diode rectifier 25 is coupled between the emitter and base of the first transistor 24 to prevent excess reverse voltage from appearing between the base and emitter of the first transistor 24.

In the current limit circuit, the voltage provided by the secondary winding 18 is supplied to a series circuit comprising a resistor 35 and a capacitor 36. This series circuit provides a varying voltage at the junction 37 of the resistor 35 and capacitor 36 that has the same period or frequency as the alternating current supply voltage. If the polarity dots of the primary winding 16 and the secondary winding 18 are considered, and for certain values of the resistor 35 and the capacitor 36, it will be seen that the voltage at the junction 37 relative to the ground 13 may have a phase which leads the phase of the voltage at the line 12 relative to the ground 13 by substantially 90 degrees. The current limit circuit also includes a voltage divider network comprising two resistors 33, 34 coupled in series with each other and coupled across or in parallel with the motor armature 10. The junction of these resistors 33, 34 is coupled to one side of the secondary winding 18 and to resistor 35. The resistors 33, 34 provide a direct current voltage at their junction which has a magnitude relative to the reference bus 32 that is instantaneously proportional to the back electromotive force being produced by the motor armature 10. This direct current voltage biases the varying voltage appearing on the junction 37. This combined phase shifted A.C. voltage from the secondary 18 and D.C. voltage supplied by the motor armature 10 constitutes the current limit voltage. This voltage is applied to the base of transistor 29 through an isolating diode 38 and causes the transistor 29 to conduct whenever the A.C. voltage is biased to a level such that this varying component is caused to exceed the reference voltage level at bus 32 for a portion of each positive half-cycle of the line voltage. By selecting the values of resistors 33 and 34 appropriately, the angle at which control device 20 fires is determined. This selection of resistor values is made at zero armature speed where the armature current reaches a maximum for a given commanded speed. With the values of these resistors determined, the maximum permissible armature current is limited for any speed command condition.

In the speed command circuit, a voltage provided by the secondary winding 19 is supplied to a series circuit comprising a resistor 49 and a capacitor 50. This series circuit provides a varying voltage at the junction 51 of the resistor 49 and the capacitor 50 that has the same period or frequency as the alternating current supply voltage. If the polarity dots of the primary winding 16 and the secondary winding 19 are considered, and if the resistor 49 and the capacitor 50 have suitable values, it will be seen that the voltage at the junction 51 relative to the ground 13 may have a phase that lags the phase of the voltage at the line 12 relative to the ground 13 by substantially 90 degrees. This voltage is coupled through a resistor 52 to an output line 53. This output line 53 is coupled to the base of the first transistor 24 in the gating circuit. The varying voltage on the output line 53 is biased by a first direct current bias voltage on a movable tap 44 of a potentiometer 43. This first bias voltage is provided by a rectifier 40 coupled to the line 12. This rectified voltage is filtered by a resistor 41 and a capacitor 42 coupled between the rectifier 40 and the ground 13. The potentiometer 43 is coupled between the lower end of the resistor 41 and the ground 13. This first bias voltage is coupled in series with a second (zero speed) direct current bias voltage provided across a capacitor 47 by two diode rectifiers 45 and 46 coupled between the ends of the secondary winding 19 and the movable tap 44. This second voltage is a negative bias, insuring that transistor 24 and thus control rectifier 20 is turned off at zero speed. The varying voltage, as biased by the two bias voltages, represents a desired speed voltage. As the movable tap 44 is moved up or down, firing of the control rectifier 20 may be advanced or retarded to provide a speed control. This relationship between the firing of the control rectifier and the signal from the speed command circuit is explained in greater detail below.

The control rectifier 20 may conduct current when its anode is positive with respect to its cathode and when a control voltage is applied between its control electrode and cathode to provide sufficient current to cause conduction during this time. Once conduction is started, the control rectifier 20 continues to conduct current until the voltage between its anode and cathode is reduced to substantially zero or is reversed. In the gating circuits, if the second transistor 29 conducts current, it shunts or bypasses the voltage between the control electrode and cathode of the control rectifier 20 so that the control rectifier 20 connot conduct. If the second transistor 29 does not conduct current, then the gating or control voltage can be applied and the control rectifier can conduct. The second transistor 29 conducts when the first resistor 24 does not conduct and does not conduct when the first transistor 24 conducts. The first transistor 24 is rendered nonconducting or conducting in accordance with the magnitude of the motor armature back electromotive force on the reference bus 32 relative to the magnitude of the speed command signal or voltage on the output line 53. The difference between these magnitudes is the error speed voltage. The speed command signal on the output line 53 is positive with respect to the back electromotive force on the reference bus 32 when the motor armature 10 is rotating below the desired speed. Under this condition, the first transistor 24 conducts, the second transistor 29 does not conduct, and the gating voltage applied to the control electrode and cathode of the control rectifier 20 causes the control rectifier 20 to conduct. This tends to increase the armature speed. However, if the back electromotive force of the motor armature 10 is sufficient, as it would be if the motor were rotating at or above the desired speed, then the voltage on the reference bus 32 would be substantially equal to or greater than the voltage on the output line 53. In this case, the first transistor 24 would be nonconducting, the second transistor 29 would be conducting, and the control rectifier 20 would not conduct. This tends to decrease the armature speed. When the motor is under some load, the control rectifier 20 will conduct for some amount of time during each part of the half cycle when the line 12 is positive with respect to the ground 13. This point or time during the half cycle depends on the magnitude of the voltage on the output line 53 supplied by the speed command circuit relative to the magnitude of the voltage on the reference bus 32 supplied by the back electromotive force of the motor armature 10. It will thus be seen that when the speed command circuit provides a signal to the gating circuit, the control rectifier 20 conducts so that the motor speed is maintained at the magnitude determined by the setting of the movable tap 44 on the potentiometer 43.

The speed command circuit just described is known in the art. In accordance with the invention, the control rectifier 20 can conduct only if the current limit circuit provides the necessary voltage signal to the gating circuit. This signal from the current limit circuit is provided at a time determined by the back electromotive force of the motor armature 10, and this time is preferably set so as to limit the armature current to whatever value is desired when the motor armature 10 is stalled or is not turning. The current limit voltage from the current limit circuit appears at the junction 37. When the back electromotive force of the armature 10 is relatively low, as it would be when the armature 10 is rotating relatively slowly, the current limit voltage or signal at the junction 37 is relatively high (actually less negative) with respect to the reference bus 32. A relatively high voltage on the junction 37 causes the second transistor 29 to conduct and this prevents the control rectifier 20 from conducting. When the back electromotive force of the armature 10 is relatively high, as it would be when the armature 10 is rotating relatively fast, the current limit voltage or signal at the junction 37 is relatively low (actually more negative) with respect to the reference bus 32. A relatively low voltage on the junction 37 causes the second transistor 29 to stop conducting, and this permits the control signal to be applied to the control rectifier 20 so that it conducts.

The operation of the current limit circuit and the speed command circuit will be explained in connection with the waveforms shown in FIGURE 2. In FIGURE 2, waveforms of voltage are shown plotted along a common time axis. The alternating current voltage of line 12 with respect to the ground 13 is shown by the dashed and dotted line curve. This voltage has a frequency such that any half cycle occupies the period of time from the time $t_0$ to the time $t_5$. The error speed voltage (the magnitude of the voltage on the line 53 relative to the magnitude of the voltage on the reference bus 32) is shown by the dashed line curve for some arbitrary commanded speed voltage set by the movable tap 44. This error speed voltage has the same period or frequency as the line voltage, but its phase lags the phase of the line voltage by substantially 90 degrees. Current limit voltages (the magnitude of the voltage on the junction 37 relative to the magnitude of the voltage on the reference bus 32) are shown by the solid line curves for three conditions, namely back electromotive forces (back E.M.F.) of 0%, 50%, and 100%. These are arbitrarily selected and represent the range of back electromotive force provided when the motor is stalled, when the motor is running at some intermediate speed, and when the motor is running at its maximum speed. The current limit voltages have the same period or frequency as the line voltage, but their phase leads the phase of the line voltage by some predetermined angle. The level at which the control rectifier 20 receives a control signal and conducts in response to the error speed voltage and the current limit voltage has been arbitrarily set by a single horizontal dashed and dotted line positioned slightly positive with respect to the zero axis. In an actual circuit, the level at which the control rectifier 20 could conduct in response to the error speed voltage would or might be different from the level at which the control rectifier 20 could conduct in response to the current limit voltage. In the half cycle from the time $t_0$ to the time $t_5$, the control rectifier 20 may conduct if, and only if, the current limit voltage is below this horizontal line and the error speed voltage is above this horizontal line. If the motor is stalled, the fact that the current limit voltage for a back electromotive force of 0% does not go below the control rectifier conducting line until the time $t_4$ prevents the control rectifier 20 from conducting until the time $t_4$ (despite the fact that the error speed voltage goes above the control rectifier conducting line at the time $t_3$.) But when the current limit voltage does go below the control rectifier conducting line at the time $t_4$, the control rectifier 20 may conduct for the remainder of the half cycle until the time $t_5$. A somewhat different condition exists for the current limit voltage for a back electromotive force of 50%. In that case the current limit voltage goes below the conducting line at the time $t_2$. But the control rectifier 20 may not begin to conduct until the time $t_3$ when the error speed voltage goes above the control rectifier conducting line and continues to the end of the half cycle. The current limit voltage for a back electromotive force of 100% goes below the conducting line at the time $t_1$. But the control rectifier 20 may not begin to conduct until the time $t_3$ when the error speed voltage goes above the conducting line and continues to the end of the half cycle. The waveforms shown in FIGURE 2 represent a few examples of many possible operating conditions. The error speed voltage may be moved or biased up or down by moving the movable tap 44, or the current limit voltage may be moved or biased up or down by changing the relative values of the resistors 33, 34 of the current limit circuit.

The waveform examples show that even under the condition where no back electromotive force is provided, the armature and other circuit elements are protected from the excessive current by the current limit voltage, this being at the time $t_4$ for that condition. For a given set of circuit values, preferably determined by current limit conditions with a back electromotive force of 0%, the control rectifier 20 may conduct earlier and earlier in a given half cycle as the back electromotive force is increased. The armature current is still limited because even though the control rectifier 20 may conduct earlier in the cycle as the back electromotive force increases, the net armature current remains substantially the same because the back electromotive force offsets or reduces the increased current resulting from earlier conduction of the control rectifier 20. At the maximum current or limit point, the speed falls to zero along a substantially vertical line (i.e., at the same current) from maximum speed to zero speed due to the abrupt nature of the current limit.

In conclusion, it will be seen that the current limit circuit of the invention provides an improved motor control which can be used to limit the armature current to any predetermined lever over the full range of motor speeds. This is achieved by proper selection of the components in the current limit circuit of FIGURE 1 preferably for zero speed conditions. This current limit circuit of the invention provides an instantaneous limiting on the basis of the back electromotive force being produced by the motor armature. The current limit circuit does not require a signal based on the armature current. Such a signal would require filtering and would thus introduce undesired time delays. In some circumstances, a time delay would be intolerable in that the equipment might be subjected to damaging current before limiting can take place. The current limit circuit may be used with or without a speed command circuit, but it is preferable that it be used with such a speed command circuit. With this arrangement, the current limit circuit and the speed command circuit both determine the point at which a control signal is applied to cause the control rectifier 20 to conduct. While the invention has been described in a particular form and embodiment, other arrangements can be used. For example, in FIGURE 1, the different arrangements can be utilized for providing the various voltages in the gating circuit, the current limit circuit, and the speed command circuit. Likewise, a different speed feedback signal can be provided, such as from a tachometer rather than from the back electromotive force of the motor armature 10. Further, the gating circuit, the current limit circuit, and the speed command circuit may be modified or may take different forms and still provide the functions desired and previously explained. The phase shift in the speed command circuit may be some value other than 90 degrees. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A circuit for supplying current to a direct current motor armature comprising a unidirectional current control device having a main current path and a control electrode, means coupling said main current path and said armature in series, a source of control voltage, gating means for coupling said source of control voltage to said control electrode in response to a signal having a predetermined characteristic, generating means for generating said signals having a varying magnitude, means coupled to said armature and to said generating means for deriving a voltage indicative of the back electromotive force of said armature and for biasing said signal therewith, and means coupling said biased signal to said gating means.

2. A circuit for controlling the amount of current supplied to a direct current motor armature from a source of alternating current comprising a unidirectional current control device having a main current path and a control electrode, means coupling said main current path of said control device in a series circuit with said armature, means coupling said series circuit to said alternating current source, a source of varying voltage having a period substantially equal to the period of said alternating current source and having a phase shifted in one direction relative to the phase of said alternating current source, a source of bias voltage having a magnitude proportional to the back electromotive force of said motor armature, means coupling said source of bias voltage to said source of varying voltage for biasing said varying voltage, and means coupling said biased varying voltage to said control electrode of said current control device so that said main current path may conduct in response to said biased varying voltage reaching predetermined magnitudes.

3. A control circuit for supplying power from an alternating current source to a direct current motor armature comprising a unidirectional current control device having a main current path and a control electrode, means coupling said main current path and said armature in series with said alternating current source, a source of unidirectional control voltage, gating means for coupling said source of control voltage to said control electrode in response to first and second signals having respective predetermined magnitudes and polarities, generating means generating said first signal, said first signal having a varying magnitude, means coupled to said armature and to said generating means for deriving a voltage indicative of the back electromotive force of said armature and for biasing said first signal therewith, means coupling said biased first signal to said gating means, generating means for generating said second signal, said second signal having a varying magnitude, control means coupled to the second signal generating means for biasing said second signal at a desired magnitude, and means coupling said biased second signal to said gating means.

4. A control circuit for supplying current from an alternating current source to a direct current motor armature comprising a unidirectional current control device having a main current path and a control electrode, means coupling said main current path and said armature in series and to said alternating current source, a source of unidirectional control voltage, gating means for coupling said source of control voltage to said control electrode in response to first and second signals having respective predetermined magnitudes and polarities, generating means for generating said first signal, said first signal having a varying magnitude and having a period substantially equal to the period of said alternating current source but having a phase shifted in one direction relative to the phase of said alternating current source, means coupled to said armature and to said generating means for deriving a voltage indicative of the back electromotive force of said armature and for biasing said first signal therewith, means coupling said biased first signal to said gating means, generating means for generating of said second signal, said second signal having a varying magnitude, control means coupled to the second signal generating means for biasing said second signal in accordance with a desired motor speed, and means coupling said biased second signal to said gating means.

5. A circuit for controlling the amount of power supplied to a direct current motor armature from a source of alternating current comprising a unidirectional current control device having a main current path and a control electrode, means coupling said main current path of said control device in a series circuit with said armature, means for coupling said series circuit to said alternating current source, a first source of varying voltage having a period substantially equal to the period of said alternating current source and having a phase advanced by a predetermined angle relative to the phase of said alternating current source, a source of direct current bias voltage having a magnitude proportional to the back electromotive force of said motor armature and being coupled to said first source of varying voltage to bias same, a second source of varying voltage, a source of direct current bias voltage having a controllable magnitude and being coupled to said second source of varying voltage to bias same, and means coupling said first and said second sources of varying voltage to said control electrode of said current control device so that said main current path may conduct in response to the biased first and second varying voltages when both reach respective predetermined levels.

6. A control circuit for supplying current from an alternating current source to a direct current motor armature comprising a unidirectional current control device having an anode, a cathode, and a control electrode, means coupling said anode to one side of said source, means coupling said cathode to one side of said armature, means coupling the other side of said armature to the other side of said alternating current source, a source of unidirectional control voltage, gating means for coupling said source of control voltage to said control electrode in response to first and second signals having respective predetermined magnitude and polarities, generating means for generating said first signal, said first signal having a varying magnitude and a period substantially equal to the period of said alternating current source but having a phase that leads the phase of said alternating current source, means coupled to said armature and to said generating means for deriving a voltage indicative of the back electromotive force of said armature and for biasing said first signal therewith, means coupling said biased first signal to said gating means, generating means for generating said second signal, said second signal having a varying magnitude and a period substantially equal to the period of said alternating current source but having a phase that lags the phase of said alternating current source, control means coupled to the second signal generating means for biasing said second signal in accordance with a motor speed error signal, and means coupling said biased second signal to said gating means.

7. A circuit for controlling the amount of current supplied to a direct current motor armature from a source of alternating current comprising a unidirectional current control device having a main current path and a control electrode, means coupling said main current path of said control device in a series circuit with said armature, means for coupling said series circuit to said alternating current source, a first source of varying voltage having a period substantially equal to the period of said alternating current source and having a phase shifted to lead the phase of said alternating current source, a first source of direct current bias voltage having a magnitude proportional to the back electromotive force of said motor armature, means coupling said first source of bias voltage to said first source of varying voltage, a second source of varying voltage having a period substantially equal to the period of said alternating current source and having a phase shifted to lag the phase of said alternating current source, a second source of direct current bias voltage having a polarity and magnitude indicative of the difference between the actual and the desired speed of said armature, means coupling said second source of bias voltage to said second source of varying voltage, and means coupling said first and said second biased varying voltages to said control electrode of said current control device so that said main current path may conduct in response to said biased first and second varying voltages when both reach respective predetermined levels and polarities.

8. In a circuit for regulating the speed of a direct current motor including a unidirectional current control device having an anode, a cathode, and a control electrode in series connection with the armature of said motor, a speed command circuit providing a first gating signal having a level biased in proportion to the difference between the actual speed of said motor and the desired speed, and a gating circuit responsive to two gating signals to couple a source of control voltage to the control electrode of said unidirectional current control device when said two gating signals both reach respective predetermined levels, the improvement comprising means coupled to said armature for deriving a bias voltage proportional to the back electromotive force of said armature, generating means for generating said second gating signal, means for combining said bias voltage with said second gating signal to regulate the level of said second gating signal, and means coupling the biased second gating signal to said gate circuit.

9. A control circuit for regulating the current from an alternating current source applied to a direct current motor, comprising a unidirectional current control device having a control electrode, means coupling said unidirectional current control device and the armature of said direct current motor across said alternating current source, a source of control voltage, gate means coupling said source of control voltage to the control electrode of said unidirectional current control device in response to first and second gating signals reaching respective predetermined levels so that said current control device is caused to conduct so long as both of said gating signals remain at said predetermined levels, first generating means for generating said first gating signal, said first gating signal having a period substantially equal to the period of said alternating current source, phase shift means coupled to said first generating means for shifting the phase of said first gating signal to lead the phase of said alternating current source, means coupled to said armature for deriving a first bias voltage proportional to the back electromotive force of said armature, first combining means for combining said first bias voltage with the phase shifted first gating signal such that the level of said first gating signal is determined by said first bias voltage, second generating means for generating said second gating signal, said second gating signal having a period substantially equal to the period of said alternating current source, phase shift means coupled to said second generating means for shifting the phase of said second gating signal to lag the phase of said alternating current source, means for deriving a second bias voltage proportional to the difference between the actual speed and the desired speed of said motor, second combining means for combining said second bias voltage with the phase shifted second gating signal such that the level of said second gating signal is determined by said second bias voltage, and means for coupling the outputs from said first and second combining means to said gate means.

References Cited by the Examiner

UNITED STATES PATENTS

| | | | |
|---|---|---|---|
| 3,024,401 | 3/1962 | Dinger | 318—331 X |
| 3,064,174 | 11/1962 | Dinger | 318—331 |
| 3,176,209 | 3/1965 | Cappello | 318—331 X |
| 3,177,418 | 4/1965 | Meng | 318—331 |
| 3,178,628 | 4/1965 | Van Patten | 318—331 |
| 3,222,585 | 12/1965 | Lobb | 318—345 X |

ORIS L. RADER, *Primary Examiner.*

S. GORDON, J. C. BERENZWEIG, *Assistant Examiners.*